United States Patent [19]
Unger

[11] Patent Number: 4,765,651
[45] Date of Patent: Aug. 23, 1988

[54] ADJUSTABLE ANCHORING SLIDE BLOCK ASSEMBLY

[75] Inventor: Hans Unger, Sylmar, Calif.

[73] Assignee: American Safety Equipment Corporation, Troy, Mich.

[21] Appl. No.: 862,767

[22] Filed: May 13, 1986

[51] Int. Cl.⁴ .................... B60R 22/24; F16H 21/16
[52] U.S. Cl. .................................. 280/804; 297/469; 280/808; 74/89.14; 74/424.6
[58] Field of Search ................ 280/801, 808, 804; 74/89.14, 425, 424.6, 89.2, 89.15, 89.17; 297/468, 483, 469

[56] References Cited

U.S. PATENT DOCUMENTS

| | | | |
|---|---|---|---|
| 169,319 | 10/1875 | Walsh | 74/425 |
| 479,390 | 7/1891 | Calcutt | 74/424.6 |
| 786,706 | 4/1904 | Wüstner | 743/424.6 |
| 2,346,728 | 4/1944 | Carlson | 74/89.2 |
| 2,490,307 | 12/1949 | Karr | 74/424.6 |
| 3,993,328 | 11/1976 | Henderson et al. | 280/807 |
| 4,218,076 | 8/1980 | Compeau | 280/804 |
| 4,238,129 | 12/1980 | Yasumatsu | 280/802 |
| 4,241,939 | 12/1980 | Suzuki et al. | 280/804 |
| 4,244,601 | 1/1981 | Nilsson | 280/808 |
| 4,245,856 | 1/1981 | Ziv | 280/802 |
| 4,265,480 | 5/1981 | Suzuki et al. | 280/803 |
| 4,296,943 | 10/1981 | Takada | 280/804 |
| 4,321,979 | 3/1982 | Kuroyama et al. | 280/804 |
| 4,343,489 | 8/1982 | Suzuki et al. | 280/804 |
| 4,350,368 | 9/1982 | Frantom et al. | 280/804 |
| 4,354,696 | 10/1982 | Volk et al. | 280/804 |
| 4,357,035 | 11/1982 | Stamboulian | 280/804 |
| 4,387,912 | 6/1983 | Moriya et al. | 280/804 |
| 4,410,061 | 10/1983 | Terabayashi | 280/802 |
| 4,411,448 | 10/1983 | Takada | 280/802 |
| 4,506,912 | 3/1985 | Ahad | 280/808 |
| 4,547,717 | 10/1985 | Radermacher et al. | 280/804 |
| 4,556,255 | 12/1985 | Kawai | 297/483 |

FOREIGN PATENT DOCUMENTS

| | | |
|---|---|---|
| 136166 | 9/1984 | European Pat. Off. . |
| 2543784 | 5/1977 | Fed. Rep. of Germany ...... 280/808 |
| 2705465 | 8/1978 | Fed. Rep. of Germany ...... 280/801 |
| 2124889 | 10/1982 | United Kingdom . |
| 2132071 | 11/1983 | United Kingdom . |
| 2136270 | 1/1984 | United Kingdom . |
| 2138670 | 4/1984 | United Kingdom . |
| 2150012 | 11/1984 | United Kingdom . |

OTHER PUBLICATIONS

European Patent Application: 117 106 Date: 2/84.
European Patent Application: 125 860 Date: 5/84.
European Patent Application: 126 578 Date: 5/84.

*Primary Examiner*—John J. Love
*Assistant Examiner*—Karin L. Ferriter
*Attorney, Agent, or Firm*—Poms, Smith, Lande & Rose

[57] ABSTRACT

An adjustable seat belt system having a plurality of anchor fittings where one or more anchoring slide block fittings comprise a gear mounted to the anchoring slide block for positioning the anchoring slide block along a track by a manual rotation device or electric motor for rotating the gear interacting with a rack located on the track. The anchoring slide block fitting can also be repositioned by rotating a screw which repositions the anchor. A double-pole double-throw switch is activated to energize the motor to move the block to a selected position.

11 Claims, 8 Drawing Sheets

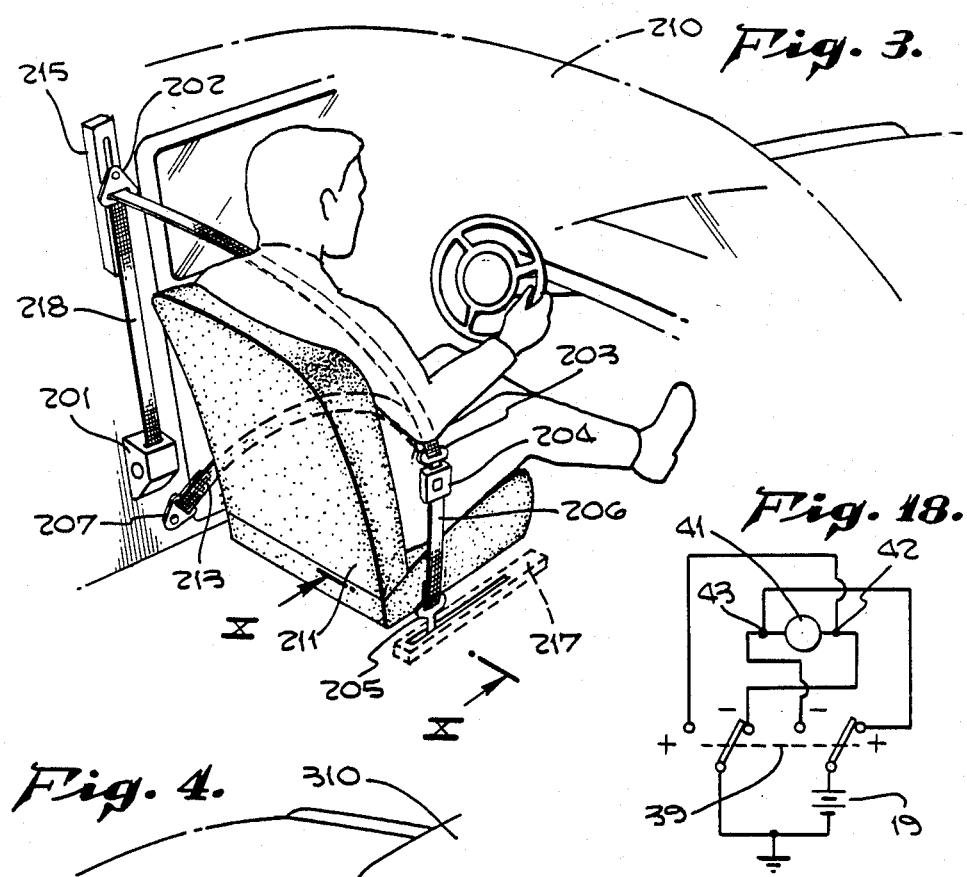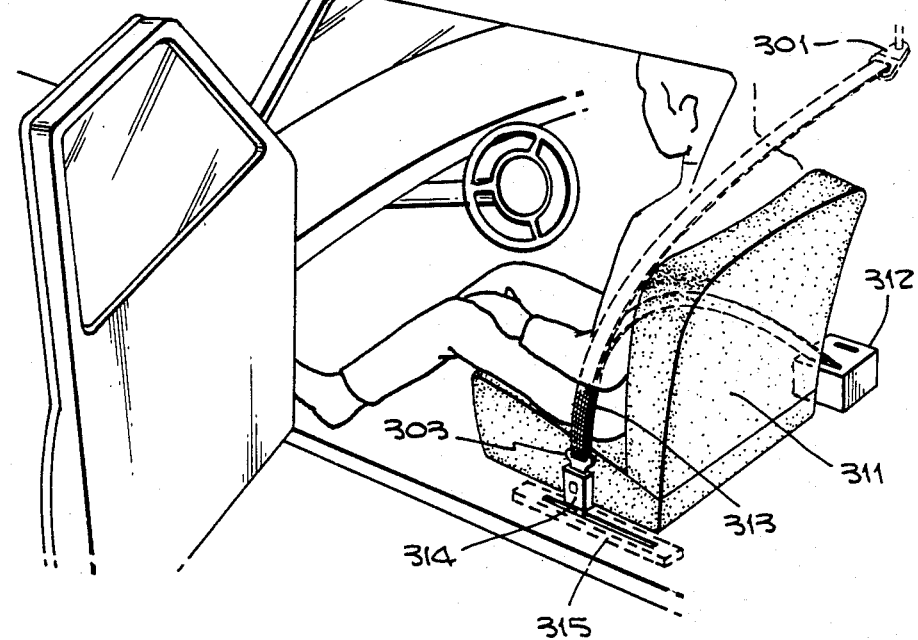

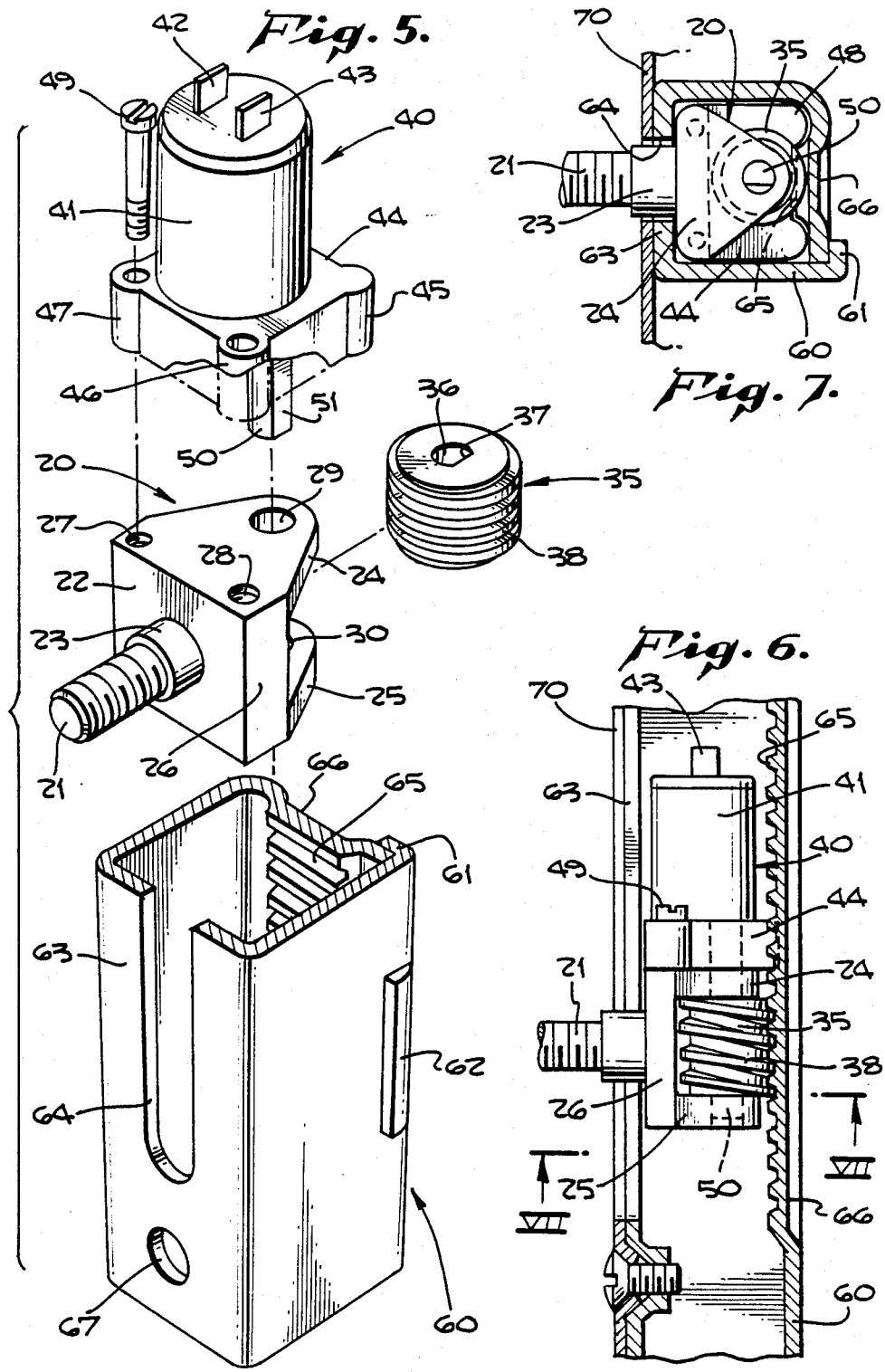

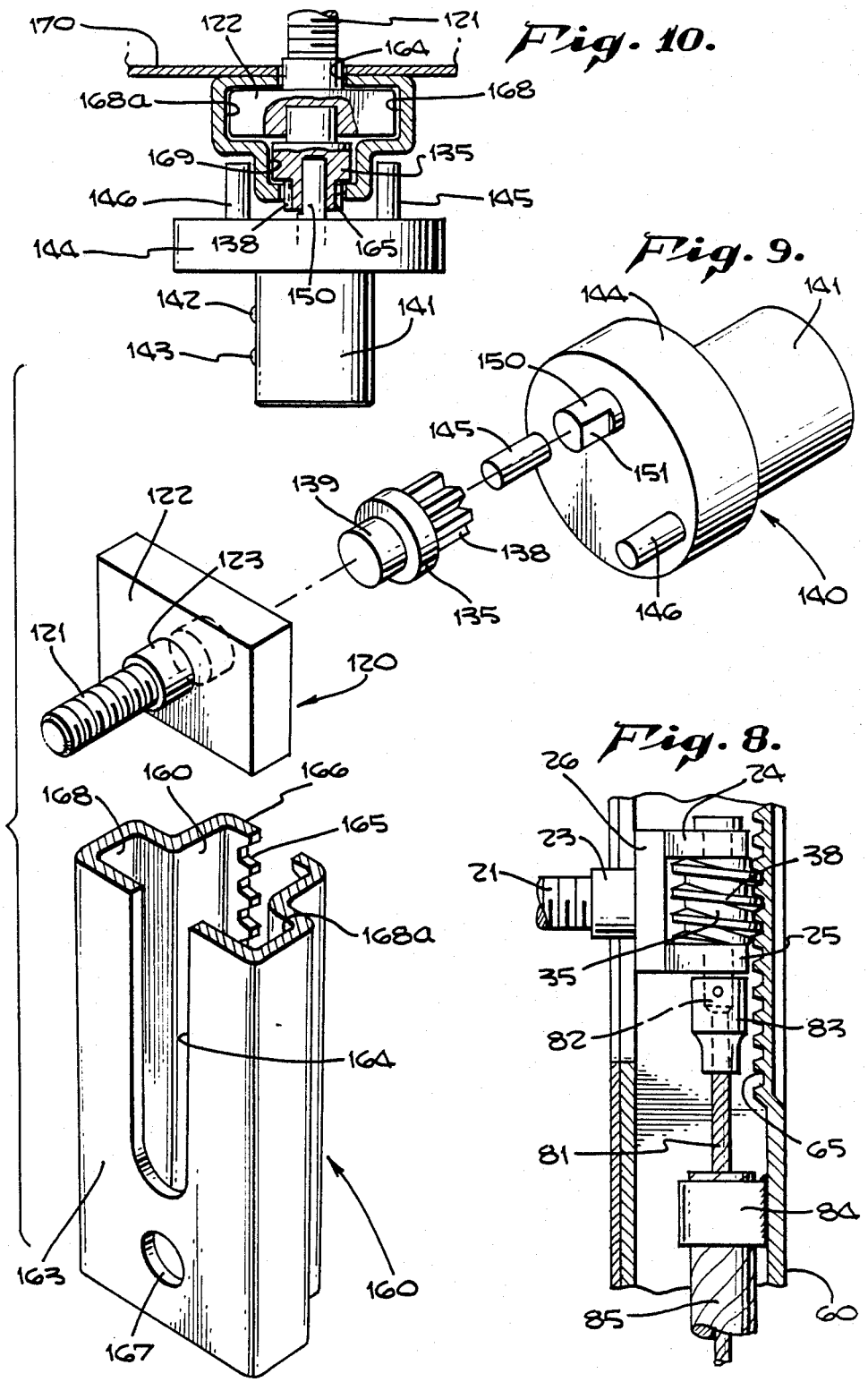

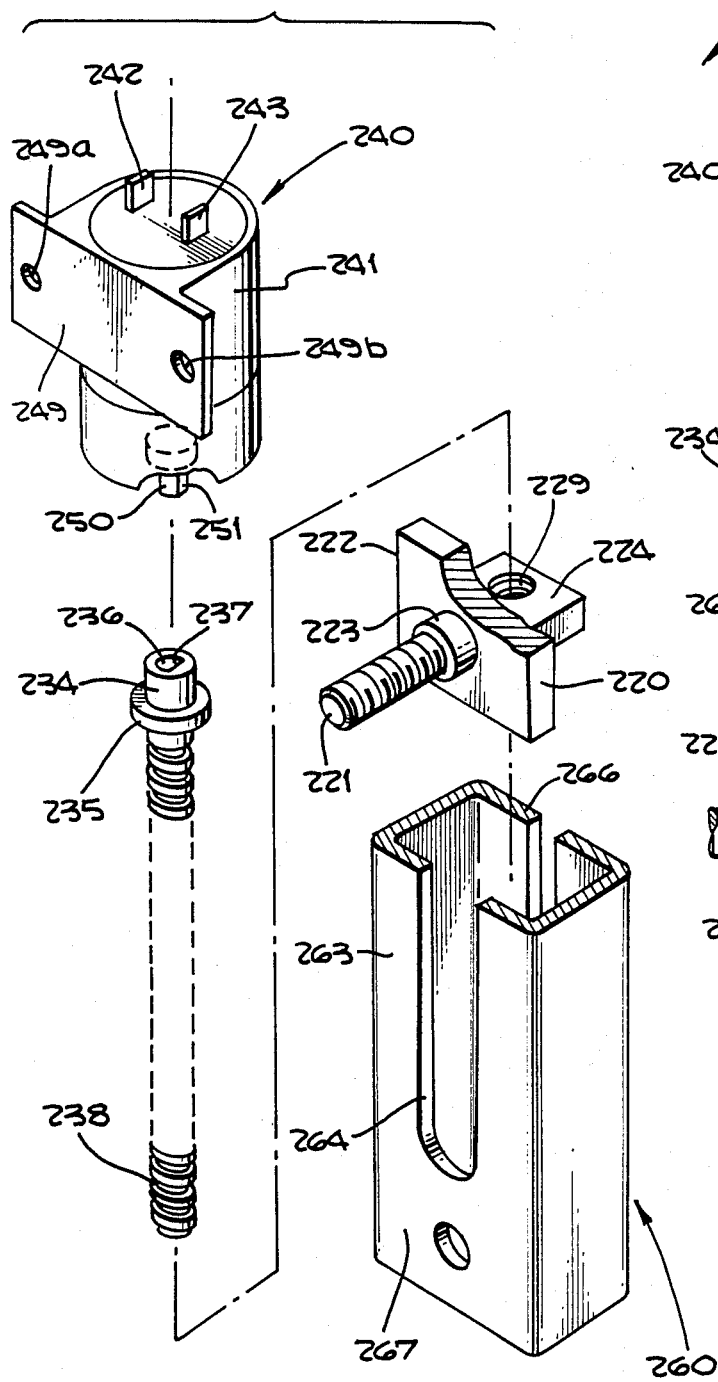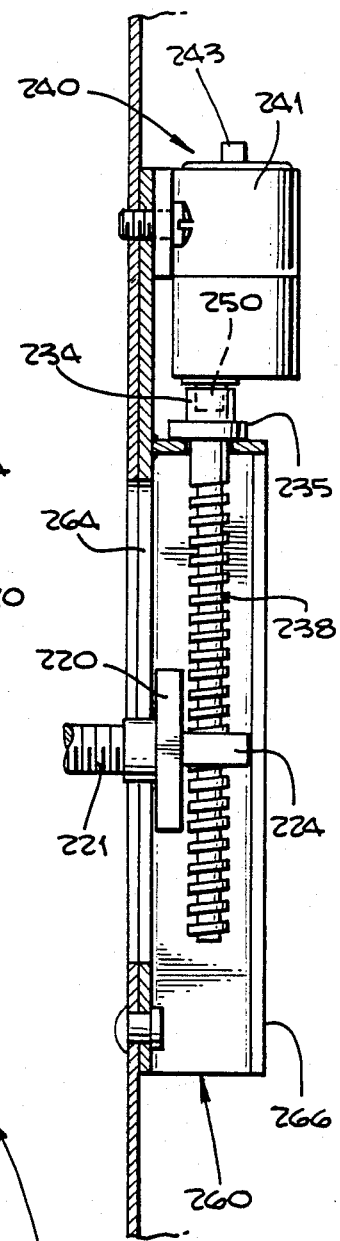

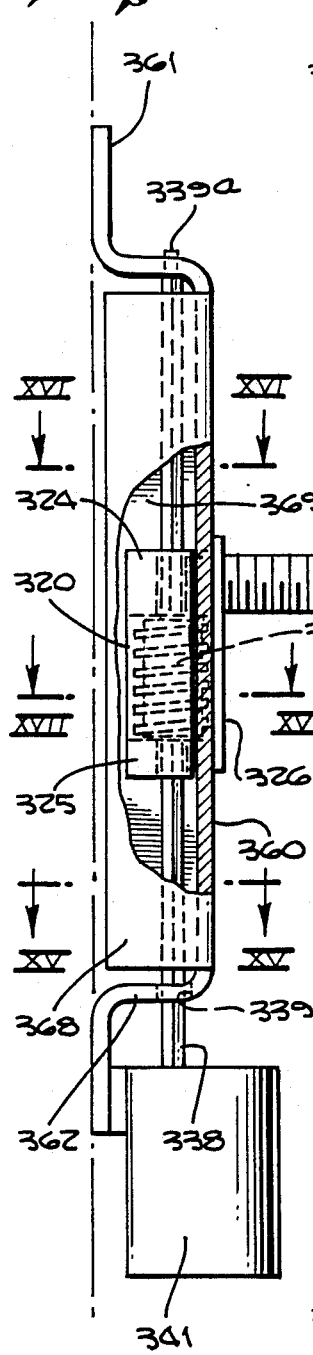
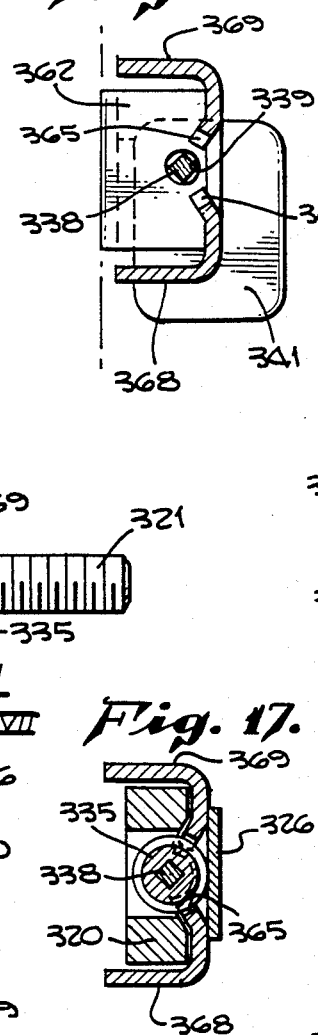
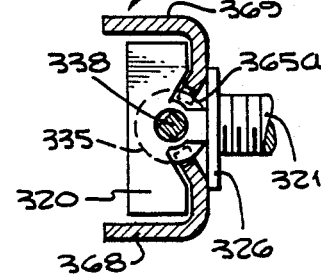
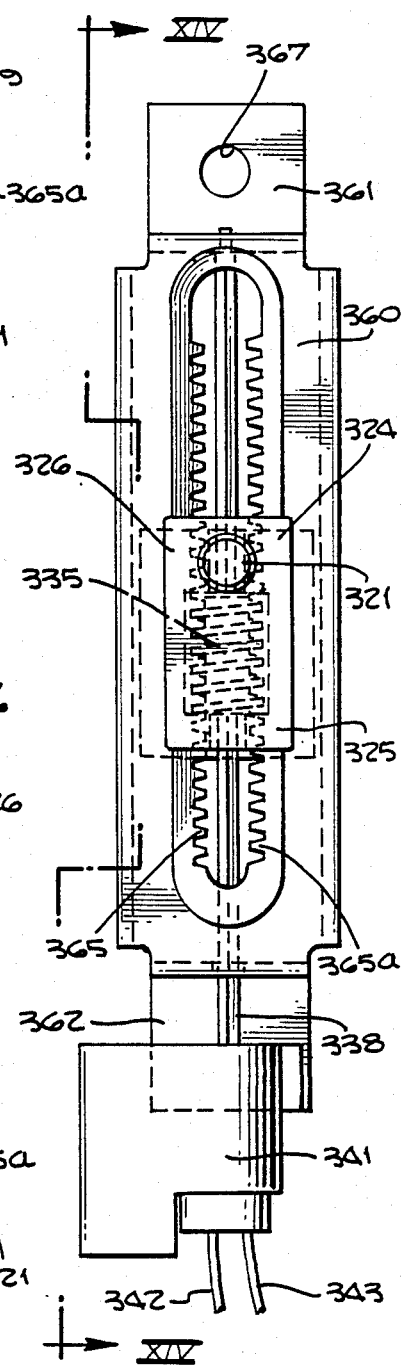
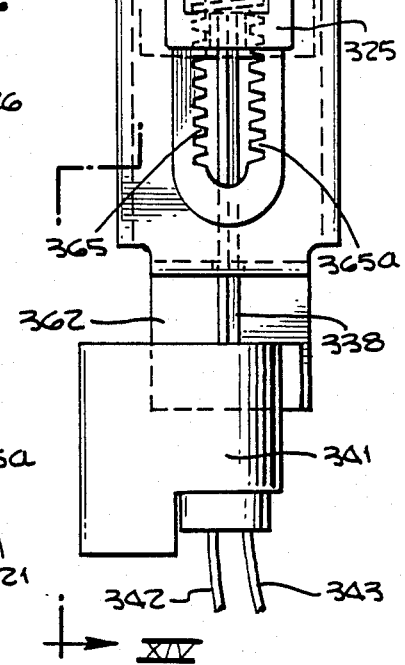

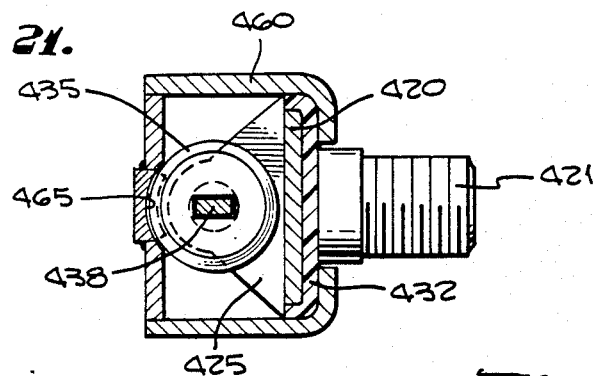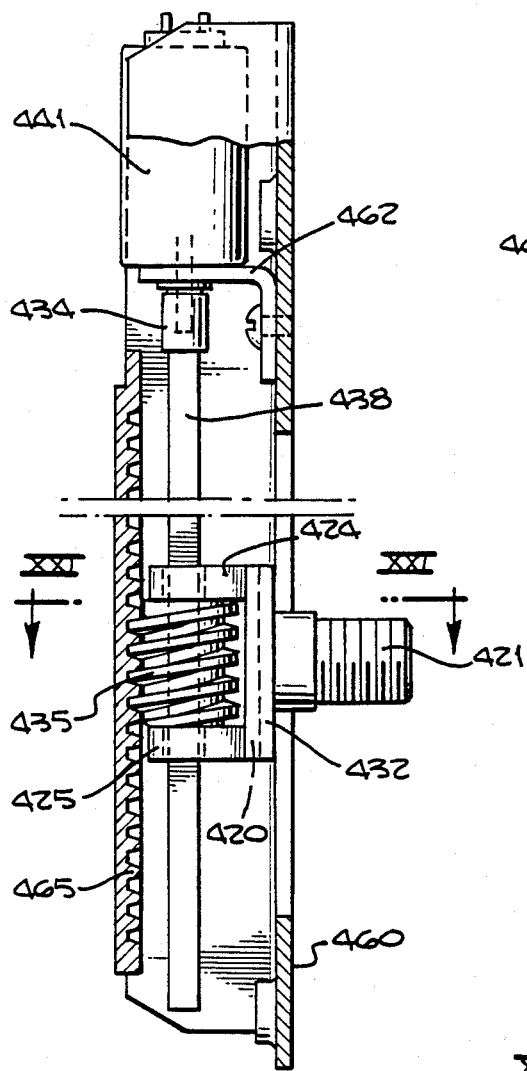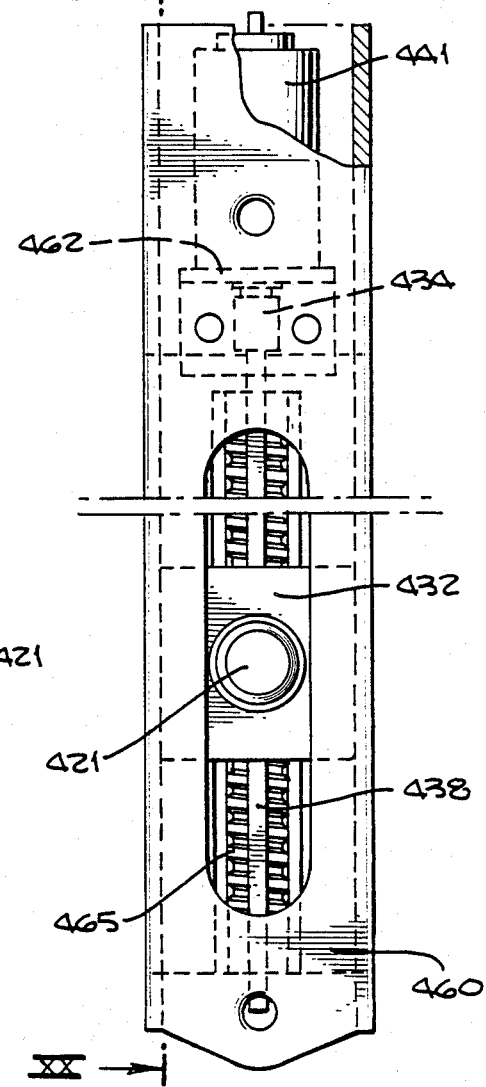

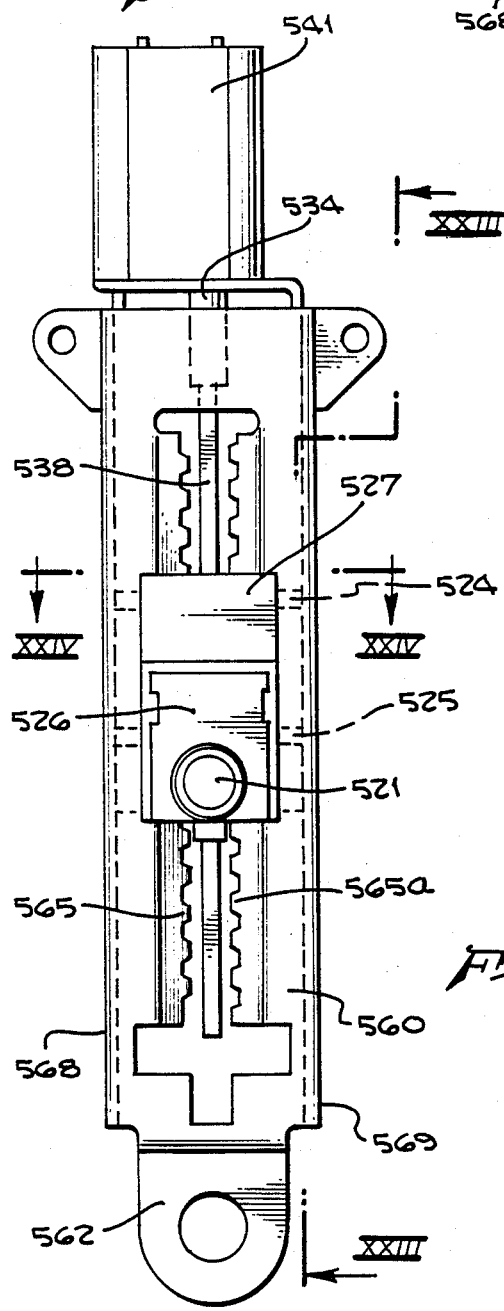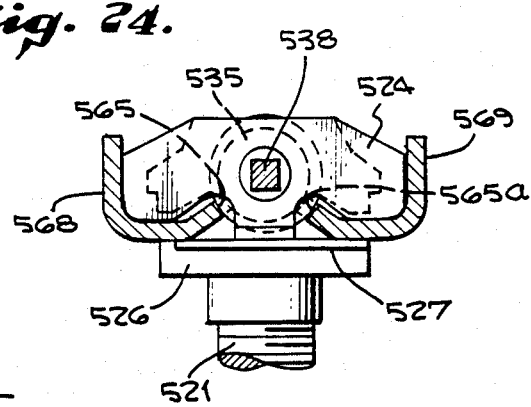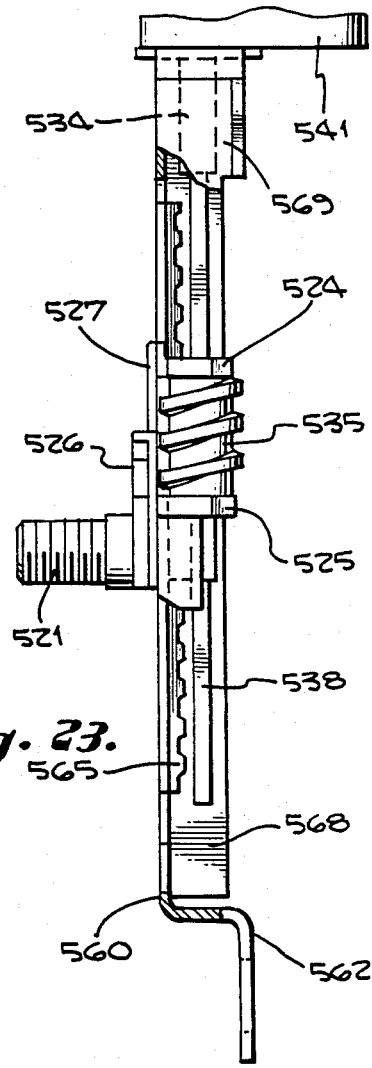

ADJUSTABLE ANCHORING SLIDE BLOCK ASSEMBLY

BACKGROUND OF THE INVENTION

This invention relates to automobile safety belt restraint harnesses and devices and more particularly to the means for anchoring the ends of seat belts employed in such devices.

It is common practice in the automotive industry to employ safety belt restraint systems having three anchor points, one for the chest belt and two for the lap belt, and means to take up slack developed by a tensionless device to promote use of belts. Typical safety belt systems do not provide any adjustment of the belt end anchors for the adjustable position of the automobile seat and the size of the passenger. A seat belt system which discloses a system for adjusting the tension and the amount of slack in the belt is the filed patent application "Automated Seat Belt Restraint System," Ser. No. 774,952, filed Sept. 11, 1985, assigned to the assignee of this invention.

It would be desirable to be able to adjust the anchor points of a three-point system safety belt since location is important for comfort and fit of belts worn under tension, slight slack or tensionless.

It is therefore a primary object of the present invention to provide and disclose a selectively adjustable anchor for one or more of the three anchor points of an otherwise conventional safety belt restraint system.

It is known heretofore to have track mountings for chest belts and door mounted lap belt anchors in so-called "passive systems" where a tape in a track runs the anchor from one end to the other end of the track. An intermediate positively selectable location of an anchor has not been provided in such passive systems since the goal was to move the belt end out of the way of a passenger entering or leaving the vehicle.

The primary objective of the present invention is to provide a positively movable and locatable anchor means for non-passive type seat belt systems where the belt harness anchor points can be selectively adjustable to the adjustment of the vehicle seat and/or the configuration of its passenger to be restrained.

It is envisioned that the adjustable anchoring slide block assembly disclosed herein may be used in conjunction with the "Automated Seat Belt Restraint System," Ser. No. 774,952, filed Sept. 11, 1985, assigned to assignee of this invention. The seat belt system may have automatic arrangements for adjusting the tension and the amount of slack in the belt to a safe tensionless zone in the safety belt based upon any movement of the anchoring slide block assembly resulting from the activation of the motor due to the inclusion of a motor sensor. The adjustable anchoring device may also be included in a fully or semi-automatic system where the operation of the gear motor will be controlled by electronic logic circuitry.

SUMMARY OF THE INVENTION

Generally stated, the seat belt system according to the present invention provides for one or more selectively adjustable anchoring devices. Each is an adjustable anchoring slide block fitting positioned along a track by a rotating means. The rotating means may either be a screw passing through the block or a gear affixed to the block. The means for rotating the gear or screw as disclosed by the preferred embodiments may either be a reversible motor activated by a double-pole, double-throw switch or a rigid cable which is manually activated.

The adjustable anchoring slide block may be located inboard of the seat, outboard of the seat, on the lower part of the interior passenger door, on the longitudinal extending roof rail or on the upper part of the B-pillar. When a system utilizes a plurality of adjustable anchors then the anchors will obviously be positioned at more than one of these locations.

BRIEF DESCRIPTION OF THE DRAWINGS

FIG. 3 shows two exemplary adjustable anchors in accordance with the present invention, one on the inboard side of the seat and the other adjustable anchor on the B-pillar.

FIG. 4 shows a fixed anchor on the inboard side of the seat, an exemplary adjustable anchor in accordance with the present invention on the outboard side of the seat, and a shoulder belt mounted to the roof.

FIG. 5 is an exploded view of an exemplary embodiment of the present invention incorporating a worm gear and rack assembly to move the exemplary belt end anchor.

FIG. 6 is a detailed cross section taken along plane VI—VI of FIG. 1.

FIG. 7 is a transverse cross section view taken in FIG. 6 along plane VII—VII.

FIG. 8 is an alternative embodiment of the adjustable anchor of the present invention showing a rigid cable assembly connected to the worm gear.

FIG. 9 is an exploded view of another exemplary embodiment of the invention showing an alternative form of a rack and pinion gear assembly to adjust the anchor position.

FIG. 10 is a transverse cross section of the embodiment shown in FIG. 9 in the assembled condition.

FIG. 11 shows another exemplary embodiment of the invention in an exploded relationship.

FIG. 12 is a detailed cross section view of the embodiment of FIG. 11 in the assembled condition.

FIG. 13 shows a plan view of an alternative exemplary embodiment of the invention.

FIG. 14 is a side view partially in section of embodiment of FIG. 13 taken therein along the plane XIV—XIV.

FIG. 15 is a cross section view of the embodiment of FIG. 14 taken therein along plane XV—XV.

FIG. 16 is a cross section view of the embodiment of FIG. 14 taken therein along plane XVI—XVI.

FIG. 17 is a cross section view of the embodiment of FIG. 14 taken therein along plane XVII—XVII.

FIG. 18 shows an exemplary electrical circuit which may be used for activating the reversible gear motor of the various exemplary embodiments of this invention.

FIG. 19 shows a plan view of an alternative exemplary embodiment.

FIG. 20 is a side view of the embodiment of FIG. 19 taken along plans XX—XX.

FIG. 21 is a cross section view of the embodiment of FIG. 20 taken along plane XXI—XXI.

FIG. 22 shows a plan view of a still further alternative exemplary embodiment of the invention.

FIG. 23 is a side view of the embodiment of FIG. 22 taken along plane XXIII—XXIII.

FIG. 24 is a cross section view of the embodiment of FIG. 23 taken along plane XXIV—XXIV.

DETAILED DESCRIPTION

Figure 1:
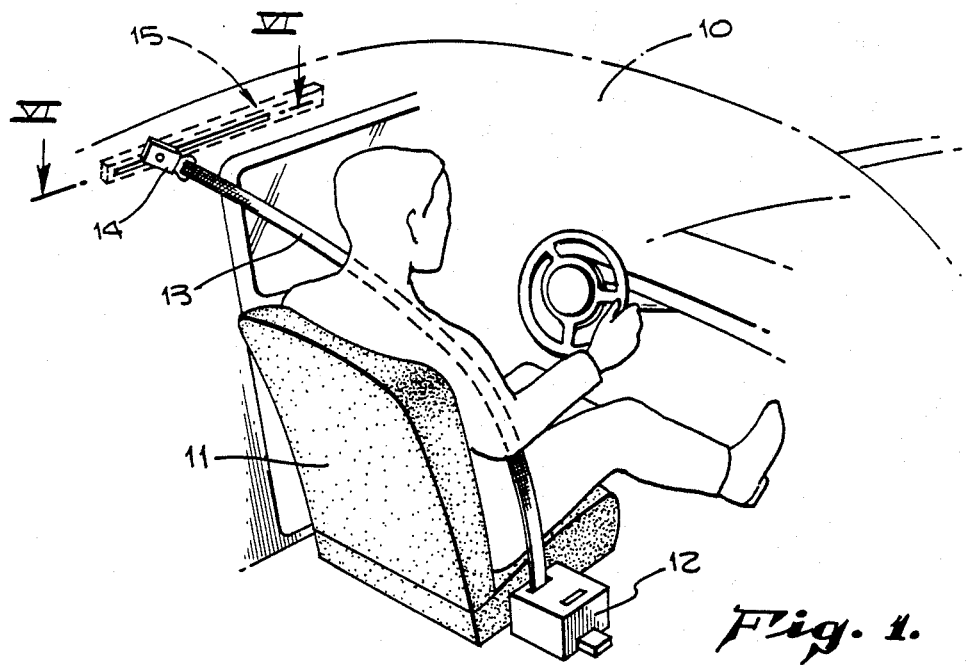
FIG. 1 shows a fixed anchor located on the inboard side of the vehicle seat and an exemplary adjustable anchor in accordance with the present invention located on the longitudinal extending roof rail of an automobile.

The exemplary embodiments of the adjustable anchoring slide block assembly of the present invention will be described in detail in association with the accompanying drawings. Referring initially to FIGS. 1-4, the preferred locations of the adjustable anchoring slide block assembly are disclosed. FIG. 1 shows a vehicle 10 where an occupant is positioned in seat 11. A stationary anchor or seat belt retractor 12 is mounted at the inboard side of the seat. A safety belt 13 crosses the chest of the passenger in seat 11 and extends to an anchor fitting 14 by a conventional buckling means mounted upon adjustable anchoring slide block assembly 15 located at the longitudinally extending roof rail of the vehicle. A knee pad may be mounted at the dashboard to make this seat belt arrangement a three-point system suitable for use in the front seat area.

Figure 2:
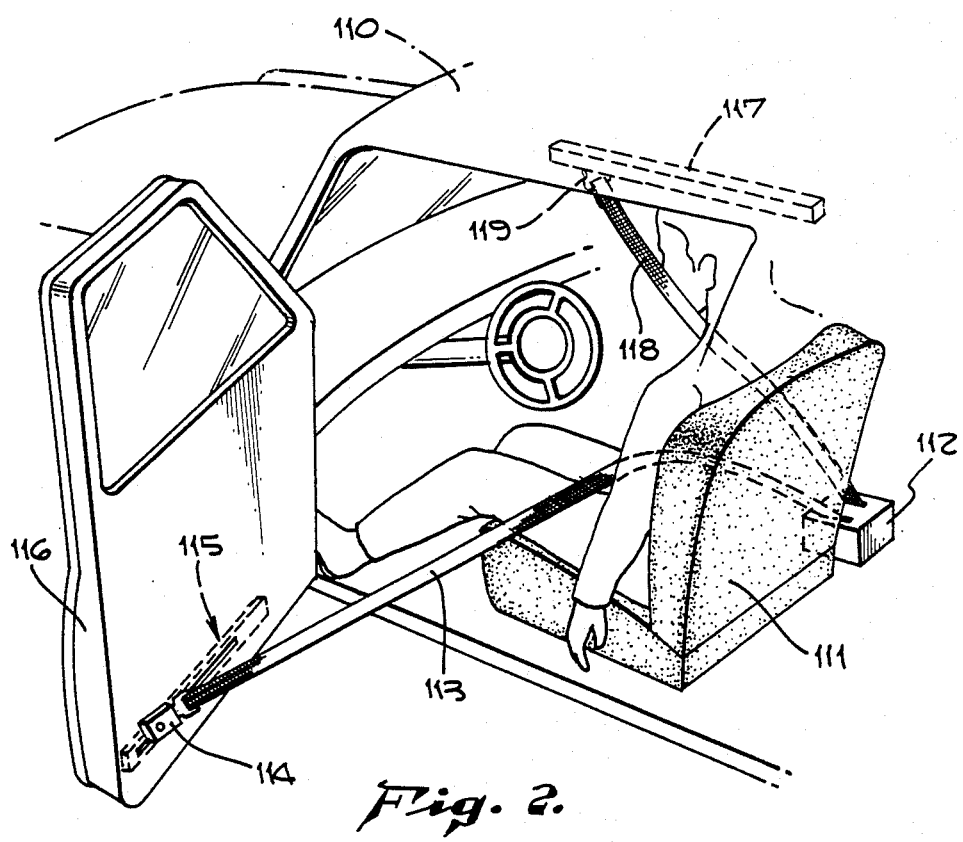
FIG. 2 shows a fixed anchor on the inboard side of the seat and two exemplary adjustable anchors in accordance with the present invention, one located on the lower part of the interior passenger door and the other adjustable anchor on the longitudinal extending roof rail.

Two adjustable anchoring slide block assemblies are illustrated in FIG. 2. The first adjustable anchoring slide block assembly 115 is mounted in the lower passenger door 116. The stationary anchor 112 is mounted on the inboard side of the passenger seat and a safety belt 113 crosses the lap of a passenger in vehicle 110 and connects to anchor fitting 114. The second adjustable anchoring slide block assembly 117 is mounted on the longitudinal extending roof rail. A shoulder safety belt 118 crosses the chest of the passenger from stationary anchor 112 to anchor fitting 119.

Two exemplary adjustable anchoring slide block assemblies are illustrated in the seat belt system disclosed in FIG. 3. Safety belt 218 is connected to fixed anchor or seat belt retractor 201 mounted on the lower portion of the B-pillar and passes through belt guide 202 mounted on the adjustable anchoring slide block 215 on the upper B-pillar. Safety belt 218 passes over the chest of the passenger to belt strap connector 203 which engages with buckle 204. When belt strap connector 203 is engaged a lap belt portion 213 is formed. The lap belt portion 213 is mounted to fixed anchor 207 outboard of the seat 211. Buckle 204 is affixed to safety belt portion 206 at one end and to anchor fitting 205 mounted to the adjustable anchoring slide block 217 inboard of the seat at the other end.

The adjustable anchoring slide block assembly 315 is mounted at the outboard side of seat 311 in FIG. 4. A stationary anchor or retractor 312 located at the inboard side of this seat. Safety belt 313 extends from retractor 312 to anchor fitting 314 through belt strap connector 303 to anchor 301 mounted on the roof of the vehicle inboard of the seat.

In an exemplary preferred embodiment, the seat belt system is provided with a plurality of anchor fittings as seen in FIGS. 1 through 4. In accordance with the present invention, one or more such anchors for the safety belt system is selectively adjustable along the associated track. An exemplary anchoring slide block means may include a gear mounted to the anchoring slide block for positioning the block along an associated track. A means for rotating the gear interacting with a rack located on the track is provided. A first preferred embodiment of the present invention is illustrated in FIGS. 5 through 7. An apparatus according to this first preferred embodiment comprises a slide block 20 and fastening means indicated generally at 21, for connecting the block 20 to a safety belt end fitting. The slide block 20 is positioned along the track 60 by a means for rotating a gear 35 which interacts with a rack 65 formed in the track 60. A fastening means 21 for affixing an end fitting of a safety belt to the anchoring slide block is affixed to the block having a load bearing planar front surface 22 through the use of a boss 23. The fastening means 21 may be a threaded member. A top flange 24 at the end of the front surface resembles an approximately triangular cross section mounted to a rectangular block. A bottom flange 25 located at the opposite end of the front surface has similar dimensional characteristics to the top flange 24. The top and bottom flanges 24, 25 create a U-shaped slot for a worm gear 35. Body 26 must be of a thickness sufficient to withstand load requirements and to receive mounting bores 27 and 28 which will be used for affixing reversible gear motor 41 to the slide block 20. Driving pin aperture 29 located on top flange 24 and lower drive pin aperture 30 on the bottom flange 25 are used for mounting the worm gear 35 in the slot so that it can rotate when activated by the motor. The anchoring slide block is fabricated from suitable metallic material capable of withstanding load requirements of an anchor as is known in the art. A suitable material has been shown to be cold formed SAE 1030-1038. The anchoring slide block of this invention may also be fabricated from steel or other suitable metal with a plastic sliding surface to reduce noise and friction forces caused by metal to metal contact.

A worm gear 35 is mounted to the exemplary anchoring slide block 20 for axial rotation between the top and bottom flanges 24, 25 for positioning the block along track 60 by a means for rotating the gear 35 interacting with a rack 65. Worm gear 35 has a bore 36 to receive the drive shaft of the motor. Bore flat 37 prevents slippage of the gear during rotation. The threaded portion of the worm gear is shown at 38. The worm gear incorporated in this invention may be produced from an injection molded fiberglass reinforced plastic.

An electrically powered drive means, indicated generally at 40, is mounted to and movable with the anchoring slide block 20 and cooperating with a track means 60 for selectively driving the anchoring slide block 20 relative to the track means. The location of the anchor fitting is selected by rotating worm gear 35 to provide the positioning of anchoring slide block 20. Worm gear 35 is rotated through the use of reversible gear motor 41. The motor has a plastic mounting base 44 with guide surfaces 45-48 forming a complementary configuration to the interior of the track, see FIG. 7. The guide surfaces 45-48 are cylindrical sections for smooth travel in the track during engagement by the worm gear 35. The reversible gear motor 41 is mounted upon the top flange 24 of the anchoring slide block 20. Clearance holes are utilized for mounting the motor upon the top flange 24 in conjunction with drive retaining screws 49.

The reversible gear motor 41 is activated by power flexible contactors being affixed to connector leads 42, 43. This activation results in the rotation of drive shaft 50 which passes through drive pin aperture 29 to engage worm gear 35. Drive shaft 50 includes drive shaft flat 51 forming a complementary fitting with the worm gear bore 36 and bore flat 37 for non-slipping engagement.

The exemplary track means in accordance with the present invention for entraining the slide block to limit movement of the block in a predetermined manner is indicated generally at 60. Track 60 is formed from high strength metallic material of suitable thickness to withstand load requirements of the anchoring slide block 20. It has been determined that HSLA 950-980 is suitable for this application. Track 60 has an overlapping flange 61, 62 bent around the corner for improved strength. Front wall 63 contains a slot 64 formed by a stamping operation which allows passage of fastening means 21 when the anchoring slide block 20 is repositioned along the track 60 by rotating worm gear 35 along rack gear 65. The rack is pressed into the back of the track forming a thread representing an infinite diameter worm gear wheel before the metal section is bent into an approximately rectangular configuration. It can be seen in FIGS. 5 through 7 that the rear wall 66 is recessed in the vicinity of the rack as a result of the forming operation. A hole 67 is provided by a punching operation below and above the slot 64 on front wall 63 for affixing the track to the interior wall of the automobile.

A detailed cross section, FIG. 6., taken from FIG. 1 shows the anchoring slide block, motor, worm gear, and track assembly. Worm gear 35 is engaged with rack gear 65 while being retained by the adjustable anchoring slide block 20.

An alternative exemplary embodiment for repositioning the adjustable anchoring slide block is a rigid cable means, indicated generally at 81, fastened to a mounting shaft 82 of the worm gear. Rotation of the cable means causes the worm gear to rotate resulting in the worm gear moving the anchoring slide block along the rack gear (FIG. 8). In this embodiment retainer 84 affixs the flexible shaft 85 to track 60.

An alternative exemplary preferred embodiment of the present invention is illustrated in FIGS. 9 and 10 with similar or corresponding elements enumerated with numbers as in the first preferred embodiment plus 100. This preferred embodiment differs from the first preferred embodiment in that a reversible motor 141 drives a pinion gear 135 affixed to a rotating drive shaft 150. The exploded view, FIG. 9, shows pinion gear with retaining shoulder 135 has a threaded gear portion 138. A set screw (not shown in the figure) tightens the gear onto drive shaft 150 of reversible gear motor 141. Adaptor pin 139 is affixed to the anchoring slide block 120. The motor mounting base 144 includes two guide pins or bearing pins 145, 146.

The exemplary anchoring slide block 120 of rectangular cross section is affixed to the opposite end of the pinion gear 135 enabling rotation of the gear to selectively position the slide block in the track guide channel 168, 168a when activated by motor 141. Gear rack 165 located on rear wall 166 is designed for the interaction with pinion gear 135. As the anchoring slide block and pinion gear assembly are repositioned in the track, guide pins 145, 146 travel along the outer walls of pinion channel 169.

Track 160 is fabricated from high strength metallic material of suitable thickness to withstand load requirements of the anchoring slide block as is known in the art. It has been found that HSLA 950-980 is a suitable material for this application. The track 160 is formed from a sheet of metal which has been cut to required dimensions such that after the fabricating process a longitudinally extending track will be formed. Gear rack 165 is shaped by stamping teeth of the rack gear onto a longitudinal segment of each edge of the metal sheet. Slot 164 is stamped at a location which will be opposite the rack gear and on the front wall 163 at the completion of the fabrication steps. Mounting hole 167 is punched below and above the elongated slot 164. The sheet is then bent to form the pinion channel 169 and guide channel 168, 168a.

A detailed transverse cross section, FIG. 10, of the rack and pinion gear engaging the anchoring slide block assembly shows guide pins 145, 146 are located at the exterior of each side of pinion channel 169. Drive shaft 150 penetrates pinion gear 135 to rotate it within track 160. Adaptor pin 139 penetrates anchoring slide block 120 which travels in guide channel 168, 168a. This assembly may be mounted to the inside wall of the vehicle B-pillar 170.

An alternative exemplary preferred embodiment of the present invention is illustrated in FIGS. 11 and 12 with similar or corresponding elements enumerated with the same numbers as the first preferred embodiment plus 200. This preferred embodiment differs from the other disclosed embodiments by the location of the drive means, indicated generally at 240, mounted remotely to the track 260 and that an elongated screw, indicated generally at 238, interconnects the anchoring slide block to the motor. The anchoring slide block 220 has a central flange 224 with a threaded drive shaft aperture 229. It has been found that a suitable material for the anchoring slide block is SAE 1030-1038.

The exemplary anchoring slide block 220 is positioned by the rotation of screw 238. At one end of screw 238 is socket 234 which includes a thrust shoulder 235. A bore 236 to receive the drive shaft of the reversible gear motor is located in socket 234. A bore flat 237 prevents slippage of the screw during rotation of the motor. The screw 238 is fabricated from SAE 1030-1038.

Reversible gear motor assembly is shown generally by 240. The motor 241 is retained by a mounting bracket 249 which has mounting bracket holes 249A and 249B. The drive shaft 250 located at the base of the motor 241 includes a drive shaft flat 251.

The exemplary track 260 has a front wall 263 which includes a slot 264 which allows the movement of the fastening means 221 connected to the anchoring slide block 220. The back wall 266 has a longitudinal slot which results from the fabrication process of track 260. An alternative fabrication process can also be used which does not have a slot. In that arrangement, the track would be fabricated such that bent flanges are located at the back wall 266 as illustrated by track 60, FIG. 5.

A detailed longitudinal view of the assembled components is seen by FIG. 12. Reversible gear motor 241 is engaged to screw 238 via drive shaft 250 and socket 234. Activation of reversible gear motor 241 results in rotation of screw 238 in central flange 224 imparting movement to anchoring slide block 220.

An alternative exemplary embodiment of the present invention is illustrated in FIGS. 13 through 17 with similar or corresponding elements enumerated with the same numbers as the first embodiment plus 300. This embodiment differs from the first embodiment because reversible motor 341 is mounted remotely to the track and a drive shaft 338 extends from the reversible motor 341 through drive shaft rotation aperture 339 to the drive shaft rotation pivot 339a. The drive shaft 338 with a square cross section penetrates the anchoring slide block 320 through the top and bottom flanges 324, 325 and the worm gear 335 positioned between the flanges. The drive shaft rotates the gear 335 for the selectable positioning of the anchoring slide block upon track 360. Worm gear 335 engages the rack 365, 365A in a complementary manner. The anchoring slide block 320, worm gear 335, and drive shaft 338 may be fabricated from plastic.

The exemplary track 360 according to this embodiment has a central elongated groove on its front face. The longitudinal edge ends of this groove are shaped to form rack gear 365, 365a. In the forming process, the longitudinal edges of the groove are bent to an approximately U-shaped configuration such that the longitudinal edges are in an approximately radial orientation to the worm gear 335 to enable positive interaction between the worm and rack gears. Sidewalls 368 and 369 enclose track 360.

Fastening means 321 is affixed to the top flange 324 through bearing plate 326 which is positioned opposite worm gear 335 and separated by the front face of the track. Bearing plate 326 has a rectangular configuration with an opened central region.

The reversible gear motor 341 is mounted to the base of the C-shaped track on lower mounting flange 362 which also provides drive shaft rotation aperture 339. Upper mounting flange 361 provides drive shaft rotation pivot 339a and assembly mounting hole 367.

A means for shifting the position of the anchor point axially along the frame of the automobile into any one of an infinite number of selectable positions is achieved by the invention. Accordingly, FIG. 18 illustrates a motor reversing circuit whereby the direction of rotation of reversible gear motor is controlled by a double-pole double-throw switch 39. A vehicle power source 19 is wired to the double-pole double-throw switch 39 which is connected by the circuit to connector leads 42, 43. When the switch position of the double-pole double-throw switch 39 is actuated toward the energized position, voltage is applied to the motor 41 to rotate the motor in one direction to move the anchor point in a predetermined direction; and conversely when the switch 39 is operated to its other energized position the motor 41 will be operated to shift the anchor point in its opposite direction.

An alternative exemplary embodiment of the present invention is illustrated in FIGS. 19 through 21 with similar or corresponding elements enumerated with the same numbers as the first embodiment plus 400. Reversible gear motor 441 mounted remotely from the anchoring slide block 420 is affixed to track 460 by mounting bracket 462. Drive shaft 438 is affixed to reversible gear motor 441 by socket 434. The drive shaft 438 with a rectangular cross section penetrates the anchoring slide block 420 and worm gear 435. The drive shaft rotates gear 435 for the selectable positioning of the anchoring slide block upon track 460. Worm gear 435 positioned between top and bottm flanges 424, 425 engages rack gear 465 in a complementary manner.

The cross-sectional view in FIG. 21 shows plastic sliding surface 432 partially enclosing the anchoring slide block 420.

An alternative exemplary embodiment of the present invention is illustrated in FIGS. 22-24 with similar or corresponding elements enumerated with the same numbers plus 500. In this embodiment reversible gear motor 541 is mounted remotely to the track and a drive shaft 538 extends from socket 534 which is affixed to the motor. The drive shaft 538 with a square cross section penetrates the anchoring slide block through top and bottom flanges 524, 525 and the worm gear 535 positioned between the flanges. The drive shaft rotates the gear 535 for the selectable positioning of the anchoring slide block upon track 560. Worm gear 535 engages rack 565, 565A in a complementary manner.

The exemplary track according to this embodiment has a central elongated groove on its front face. The longitudinal edge ends of this groove are shaped to form rack gear 565, 565A and are in an approximate radial orientation to the worm gear 535 to enable positive interaction between the worm and rack gears. Tract 560 further includes upper mounting flange 561 and lower mounting flange 562. Side walls 568 and 569 enclose the track.

Fastening means 521 is affixed to bearing plate 526. Bearing plate 526 is affixed to mounting plate 527 which incorporates top and bottom flanges 524, 525 for retaining worm gear 535.

I claim:

1. An adjustable seat belt system having a plurality of anchor fittings wherein one or more such anchor fittings comprise:
   a track;
   an anchoring slide block movable along said track;
   a pinion gear mounted to said anchoring slide block for positioning said anchoring slide block along the track;
   means for rotating the gear interacting with a rack located on said track comprising a motor to activate said pinion gear affixed to a rotating drive shaft on said motor;
   said anchoring slide block of rectangular cross section affixed to the pinion gear enabling rotation of the gear to position the anchoring slide block along the track guide channel;
   a fastening means located on said anchoring slide block for affixing an end fitting of a seat belt to the slide block; and
   said track comprising an elongated pinion receiving channel containing a rack gear enabling the pinion gear to be moved there along within said channel and outer surfaces of the pinion channel form a bearing surface for a bearing means located at the base of the motor to slide upon;
   whereby the positioning of the anchoring slide block is affected with respect to the vehicle seat position and size of occupant to be restrained.

2. An adjustable seat belt system having a plurality of anchor fittings wherein one or more such anchor fittings comprise;
   a track;
   an anchoring slide block movable along said track comprising a front surface, a top flange at one end of the front surface, a bottom flange at the opposite end of the front surface, and a fastening means for affixing an end fitting of a safety belt to said front surface;
   a worm gear mounted to said anchoring slide block positioned for axial rotation in a U-shaped slot between the top and bottom flanges for positioning said anchoring slide block along said track;

means for rotating the gear interacting with a rack located on said track comprising a motor with a base mounted upon the top flange of said anchoring slide block; and a drive shaft from the motor passing through a drive pin aperture in the top flange of the anchoring slide block to engage said worm gear;

whereby the positioning of the anchoring slide block is affected with respect to the vehicle seat position and size of occupant to be restrained by rotating the worm gear by the motor to position the block along the rack.

3. An adjustable seat belt system having a plurality of anchor fittings wherein one or more such anchor fittings comprise;

a track;

an anchoring slide block movable along said track comprising a front surface, a top flange at one end of the front surface, a bottom flange at the opposite end of the front surface, and a fastening means for affixing an end fitting of a safety belt to said front surface;

a worm gear mounted to said anchoring slide block positioned for axial rotation in a U-shaped slot between the top and bottom flanges for positioning said anchoring slide block along said track;

means for rotating the gear interacting with a rack located on said track comprising a motor mounted remotely from said anchoring slide block; and a drive shaft connecting motor to said gear;

whereby the positioning of the anchoring slide block is affected with respect to the vehicle seat position and size of occupant to be restrained by rotating the worm gear by the motor to selectively position the block along the rack.

4. An adjustable seat belt system having a plurality of anchor fittings wherein one or more such anchor fittings comprise;

a track;

an anchoring slide block movable along said track comprising a front surface, a top flange at one end of the front surface, a bottom flange at the opposite end of the front surface, and a fastening means for affixing an end fitting of a safety belt to said front surface;

a worm gear mounted to said anchoring slide block positioned for axial rotation in a U-shaped slot between the top and bottom flanges for positioning said anchoring slide block along said track;

means for rotating the gear interacting with a rack located on said track comprising a rigid cable means fastened to a mounting shaft on said worm gear whereby rotation of the cable means causes the worm gear to rotate resulting in the worm gear moving the anchor and slide block along the rack gear;

whereby the positioning of the anchoring slide block is affected with respect to the vehicle seat position and size of occupant to be restrained.

5. The safety belt system in any of claims 1, 2, 3, or 4 wherein a first anchor fitting of said anchor fittings is located inboard of the seat.

6. The safety belt system of claim 5 wherein a second anchor fitting of said anchor fittings is located at the longitudinally extending roof rail.

7. The safety belt system in any of claims 1, 2, 3, or 4 wherein a first anchor fitting of said anchor fittings is located outboard of the seat.

8. The safety belt system in any of claims 1, 2, 3, or 4 wherein a first anchor fitting of said anchor fittings is located on the passenger door.

9. The safety belt system in any of claims 1, 2, 3, or 4 wherein a first anchor fitting of said anchor fittings is located on the B-pillar.

10. The safety belt system in any of claims 1, 2, 3, or 4 wherein a first and second anchor fitting of said one or more anchor fittings is located on the inboard side and outboard side of the seat respectively.

11. The adjustable seat belt anchoring slide block assembly in any of claims 1, 2, 3, or 4 wherein the means for rotating the gear comprises a reversible motor activated by a double-pole double-throw switch.

* * * * *